United States Patent
Liobe et al.

(10) Patent No.: US 10,044,958 B1
(45) Date of Patent: Aug. 7, 2018

(54) IN-PIXEL DIGITAL GAIN AND OFFSET CORRECTIONS

(71) Applicant: Sensors Unlimited, Inc., Princeton, NJ (US)

(72) Inventors: John Liobe, New York, NY (US); Andrew Eckhardt, Richboro, PA (US); Joshua Lund, Dallas, TX (US)

(73) Assignee: Sensors Unlimited, Inc., Princeton, NJ (US)

( * ) Notice: Subject to any disclaimer, the term of this patent is extended or adjusted under 35 U.S.C. 154(b) by 0 days.

(21) Appl. No.: 15/427,765

(22) Filed: Feb. 8, 2017

(51) Int. Cl.
*H04N 5/365* (2011.01)
*H04N 5/378* (2011.01)
*H04N 5/374* (2011.01)

(52) U.S. Cl.
CPC ........ *H04N 5/3658* (2013.01); *H04N 5/378* (2013.01); *H04N 5/3742* (2013.01)

(58) Field of Classification Search
CPC ...... H04N 5/332; H04N 5/3658; H04N 5/378; H04N 5/365; G06T 2207/10048; G06T 5/002
See application file for complete search history.

(56) References Cited

U.S. PATENT DOCUMENTS

| | | | |
|---|---|---|---|
| 9,094,628 B2 | 7/2015 | Williams | |
| 9,200,954 B2 * | 12/2015 | Lin | ............. G01J 1/44 |
| 9,514,378 B2 | 12/2016 | Armstrong-Crews et al. | |
| 2006/0181627 A1 * | 8/2006 | Farrier | ............. H01L 27/14603 |
| | | | 348/308 |
| 2012/0218445 A1 * | 8/2012 | Petilli | ............. H04N 5/357 |
| | | | 348/241 |
| 2013/0001626 A1 | 1/2013 | Yamazaki et al. | |

* cited by examiner

*Primary Examiner* — Trung Diep

(74) *Attorney, Agent, or Firm* — Locke Lord LLP; Scott D. Wofsy; Joshua L. Jones

(57) ABSTRACT

A method includes correcting for at least one of gain and offset during frame integration for photodetector events. Gain and offset correction is performed separately in each pixel of a digital read-out integrated circuit (DROIC) for a plurality of corresponding pixels in a photodetector array. First and second binary counters respectively use a gain register and an offset register to implement gain and offset correction.

12 Claims, 3 Drawing Sheets

IN-PIXEL DIGITAL GAIN AND OFFSET CORRECTIONS

BACKGROUND OF THE INVENTION

1. Field of the Invention

The present disclosure relates to imaging, and more particularly to gain and offset corrections in digital imaging.

2. Description of Related Art

Many imaging sensors require pixel-wise corrections to adjust for gain, offset, and linearity variation. This is typically done with digital post-processing. Correction parameters may be stored in non-volatile memory and/or dynamic random access memory (DRAM) and can be loaded into a correction processor as pixel values are read out. The power and electronics complexity for supporting a high bandwidth memory interface are both significant contributors to camera SWaP (size, weight, and power).

The conventional techniques have been considered satisfactory for their intended purpose. However, there is an ever present need for improved gain and offset correction. This disclosure provides a solution for this problem.

SUMMARY OF THE INVENTION

A method includes correcting for at least one of gain and offset during frame integration for photodetector events. Gain and offset correction is performed separately in each pixel pitch of a digital read-out integrated circuit (DROIC) for a plurality of corresponding pixels in a photodetector array.

The DROIC can include a first binary counter and a second binary counter in each pixel pitch of the DROIC. Correcting can include counting pulses in a pulse stream by incrementing a counter value in the first binary counter of each pixel in the DROIC, and resetting counter value in the first binary counter whenever the counter value reaches a value equal to a value in a respective gain register for each the pixel pitch of the DROIC.

The method can include disabling the second binary counter each time the counter value of the first binary counter reaches the value equal to the value in the respective gain register. This same method can include masking a subsequent pulse after resetting the counter value of the first binary counter to refrain from incrementing the counter value in the secondary binary counter for the subsequent pulse.

In another aspect, it is contemplated that the method can include loading an offset register value into the second binary counter in the DROIC to initialize the counter value of the second register at the beginning of frame integration, and reading out the counter value from the second binary counter at the end of frame integration so that the second binary counter reads out a gain and offset corrected digital output for each respective pixel pitch of the DROIC. Offset and gain registers for each pixel pitch of the DROIC need only be loaded once for multiple frame integrations.

A system includes a photodetector array including a plurality of photodetector pixels. A read-out integrated circuit (ROIC) is operatively connected to the photodetector array. A digital read-out integrated circuit (DROIC) is operatively connected to the ROIC to receive pulses from the ROIC indicative of photodetector events incident on the photodetector pixels. The DROIC includes a respective pixel pitch for each of the photodetector pixels. Each pixel pitch of the DROIC includes a first binary counter configured to increment a counter value of the first binary counter in response to pulses read into the first binary counter, a comparator operatively connected to a respective gain register and to the first binary counter to compare the counter value of the first binary counter to a gain value of the gain register, and a second binary counter operatively connected to the comparator to disable the second binary counter from incrementing its counter value each time the counter value of the first binary counter equals the gain value of the gain register.

The system can include a respective offset register in each pixel pitch of the DROIC operatively connected to the second binary counter, wherein the second binary counter is configured to initialize the counter value of the second binary counter to equal the offset value of the offset register and to read out gain and offset corrected digital output. The system can include at least one of a non-volatile memory or a dynamic random access memory (DRAM) operatively connected to the DROIC to load values for the offset register and the gain register for each pixel pitch of the DROIC only once for multiple frame integrations.

Each of the first binary counter and the second binary counter can be operatively connected to receive a pulse stream from an imaging pixel. The comparator can have an output connected to reset the counter value in the first binary counter whenever the counter value of the first binary counter equals the gain value of the gain register, and a NOT logic component can connect the output of the comparator to the second binary counter to disable the second binary counter when the counter value in the first binary counter equals the gain value of the gain register.

In another aspect, only the first binary counter need be operatively connected to receive a pulse stream from an imaging pixel, e.g., wherein the second binary counter is not directly connected to receive the pulse stream. The comparator can have an output connected to reset the counter value in the first binary counter whenever the counter value of the first binary counter equals the gain value of the gain register, and a XOR logic component can be included, wherein the XOR logic component has two inputs, one connected to receive the pulse stream and another connected to the output of the comparator, and wherein the XOR logic component includes an output connected as an input to the second binary counter.

At least one of the gain register or the offset register can be physically located in the pixel pitch of the DROIC for each respective photodetector pixel. It is also contemplated that at least one of the gain register or the offset register can be physically located outside of the pixel pitch of the DROIC for each respective photodetector pixel.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
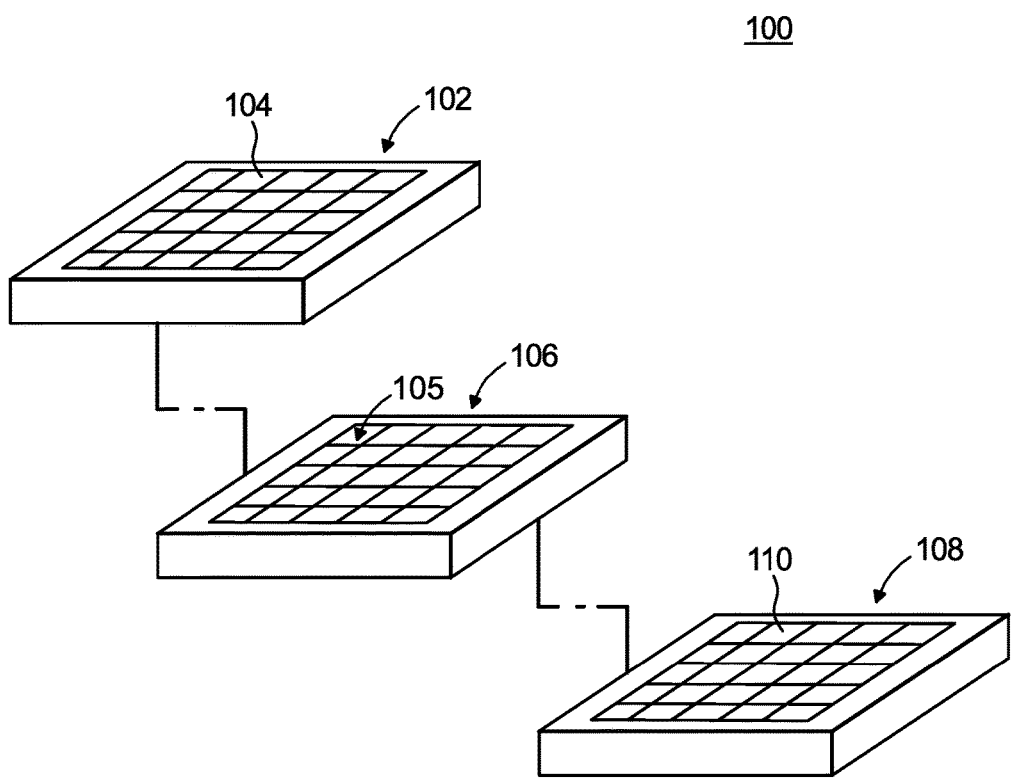
FIG. 1 is a schematic, exploded perspective view of an exemplary embodiment of a system constructed in accordance with the present disclosure, showing a photodetector array, a read-out integrated circuit (ROIC), and a digital read-out integrated circuit (DROIC)

Reference will now be made to the drawings wherein like reference numerals identify similar structural features or aspects of the subject disclosure. For purposes of explanation and illustration, and not limitation, a partial view of an exemplary embodiment of a system in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used for digital gain and offset correction in imaging devices such as digital cameras.

System 100 includes a photodetector array 102 including a plurality of photodetector pixels 104. A read-out integrated circuit (ROIC) 106 is operatively connected to the photodetector array 102 to receive and condition signals from the pixels 104 for the read-out on a pixel by pixel basis. The ROIC 106 includes one respective pixel 105 for each of the photodetector pixels 104. A digital read-out integrated circuit (DROIC) 108 is operatively connected to the ROIC 106 to receive pulses from the ROIC 106 indicative of photodetector events incident on the photodetector pixels, such as arrival of a given number of photons. The DROIC 108 includes a pixel 110 for each of the photodetector pixels 104. For the DROIC 108, a pixel 110 can also represent some digital circuit elements available to each photodetector pixel 104 in photodetector array 102, but these digital circuit elements need not be confined in the same pixel pitch as photodetector pixel 104.

Figure 2:
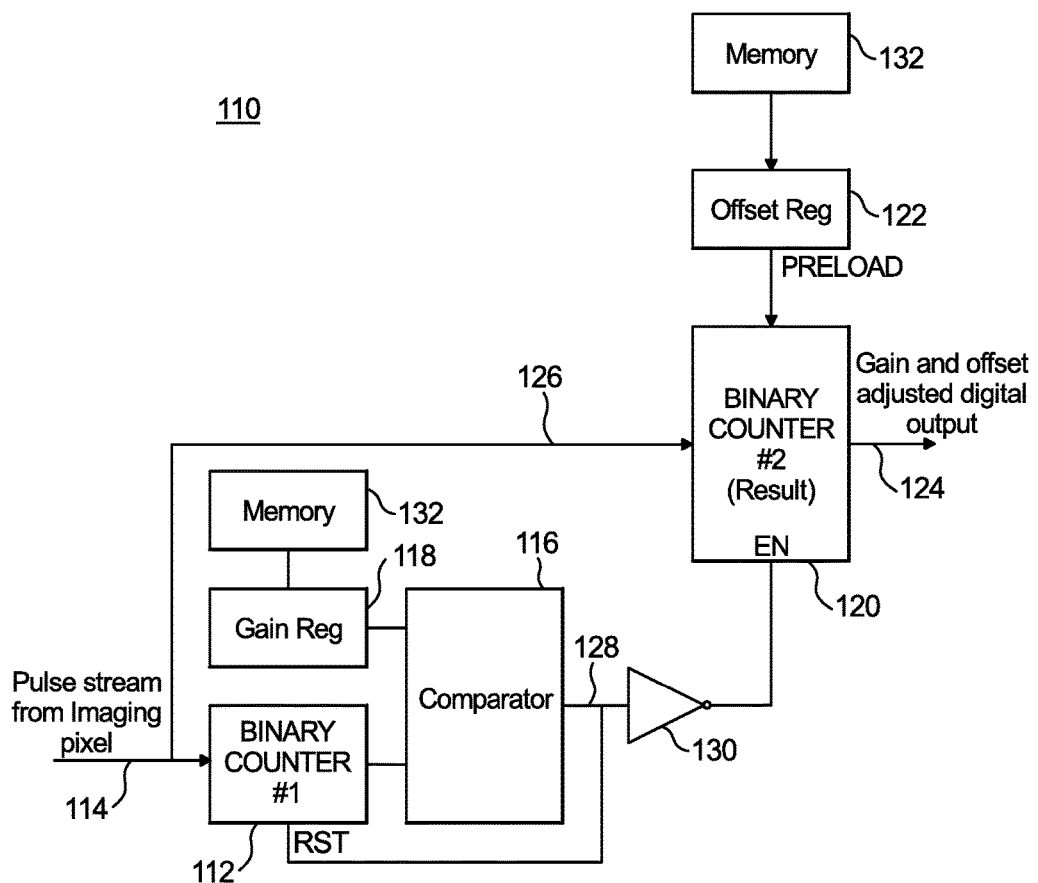
FIG. 2 is a schematic view of one of the pixel implementations of the DROIC of FIG. 1, showing an embodiment of the connections of the binary counters.

With reference now to FIG. 2, each pixel 110 of the DROIC 108 includes a first binary counter 112 configured to increment a counter value of the first binary 112 counter in response to pulses read into the first binary counter, e.g., from line 114. A comparator 116 is operatively connected to a respective gain register 118 and to the first binary counter 112 to compare the counter value of the first binary counter 112 to a gain value of the gain register 118. A second binary counter 120, or gain and offset corrected result counter, is operatively connected to the comparator 116 to disable the second binary counter 120 each time the counter value of the first binary counter 112 equals the gain value of the gain register 118. A respective offset register 122 is included in each pixel 110 of the DROIC 108, operatively connected to the second binary counter 120. The second binary counter 120 is configured to initialize the counter value of the second binary counter 120 to equal the offset value of the offset register 122, and to read out a gain and offset corrected digital output, e.g., from line 124.

Each of the first binary counter 112 and the second binary counter 120 is operatively connected to receive a pulse stream from an imaging pixel, e.g., through lines 114 and 126. The comparator 116 has an output 128 connected to reset the counter value in the first binary counter 112 whenever the counter value of the first binary counter 112 equals the gain value of the gain register 118. The output 128 of the comparator 116 is also connected to a NOT logic component 130 that connects the output 128 of the comparator 116 to the second binary counter 120 to disable the second binary counter 120 when the counter value in the first binary counter 112 equals the gain value of the gain register 118.

The system 100 can include a memory 132 such as a non-volatile memory and/or a dynamic random access memory (DRAM) operatively connected to the pixel 110 of the DROIC 108 to load values for the offset register 122 and the gain register 118 at each pixel 110 of the DROIC 108. This loading of offset and gain values need only occur once for multiple frame integrations, as opposed to having to load the offset and gain values from memory each time a frame is integrated, e.g., each time a photograph or a frame of a video is taken.

At least one of the gain register 118 or the offset register 122 can be physically located in the pixel 110 of the DROIC 108 for each respective pixel pitch 104 of the photodetector array 102. It is also contemplated that at least one of the gain register 118 or the offset register 122 can be physically located outside of the pixel pitch 110 of the DROIC 108 for each respective pixel 110 of the DROIC 108.

Figure 3:
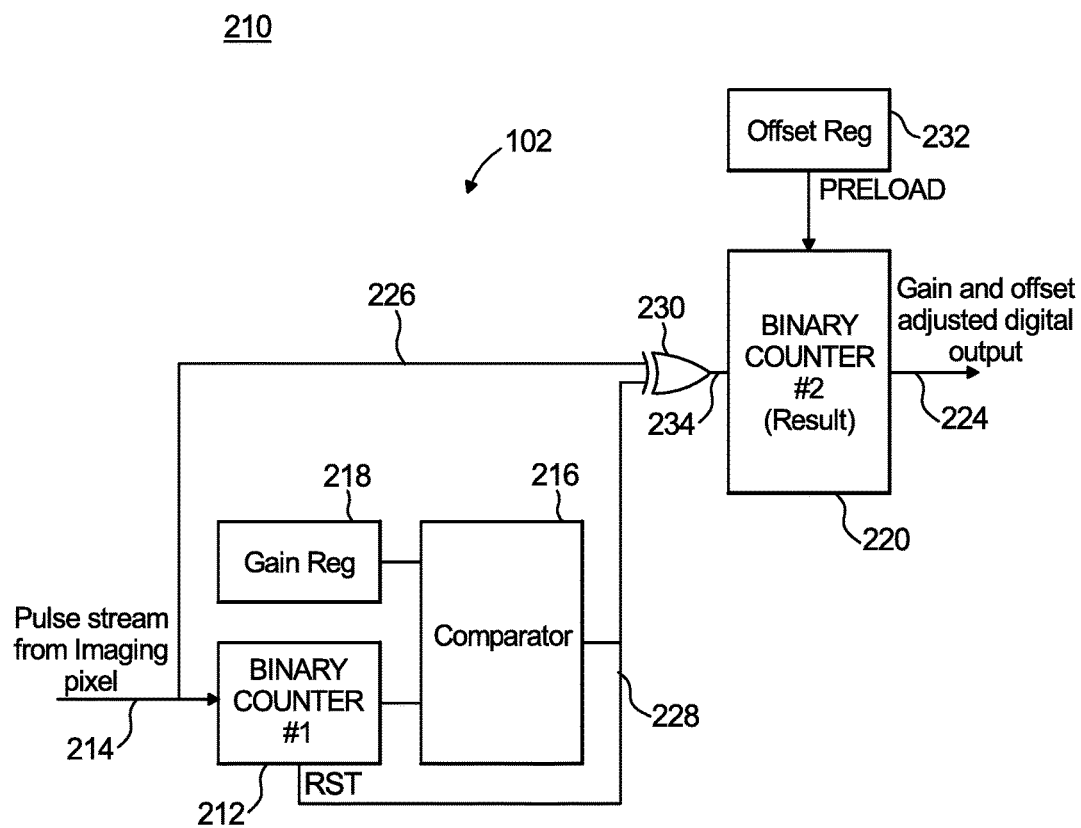
FIG. 3 is a schematic view of another of the pixel implementations of the DROIC of FIG. 1, showing another embodiment of the connections of the binary counters.

With reference now to FIG. 3, another exemplary embodiment of a DROIC pixel 210 is shown, which can be used in lieu of DROIC pixel 110. DROIC pixel 210 includes a line 214 for input, a first binary counter 212, a comparator 216, a gain register 218, a second binary counter 220, an offset register 222, and a line 224 for read-out much as described above. Only the first binary counter 212 is operatively connected to receive a pulse stream from an imaging pixel, e.g., the second binary counter 220 is not directly connected to receive the pulse stream from line 214. The comparator 216 has an output 228 connected to reset the counter value in the first binary counter 212 whenever the counter value of the first binary counter 212 equals the gain value of the gain register 218. A XOR logic component 230 can be included. The XOR logic component 230 has two inputs, one connected to receive the pulse stream, e.g., from line 226, the other connected to the output 228 of the comparator 216. The XOR logic component 230 includes an output 234 connected as an input to the second binary counter 220, so that binary counter 220 increments its counter value whenever the counter value of the first binary counter 212 is reset. In short, the pulse stream in lines 214 and 114, and the read-out from lines 124 and 224 in DROIC pixels 110 and 210 operate identically, i.e., the same input results in the same output for DROIC pixels 110 and 210.

A method includes correcting for at least one of gain and offset during frame integration for photodetector events. Gain and offset correction is performed separately in each pixel pitch, e.g. pixels 110 or 210, of a DROIC, e.g., DROIC 108, for a plurality of corresponding pixels, e.g. pixels 104, in a photodetector array, e.g., photodetector array 102.

The DROIC can include a first binary counter, e.g. binary counters 112 and 212, and a second binary counter, e.g., second binary counters 120 and 220, in each pixel pitch of the DROIC. Correcting can include counting pulses in a pulse stream by incrementing a counter value in the first binary counter of each pixel in the DROIC, e.g., where each pulse represents an amount of photocharge, and resetting the counter value in the first binary counter whenever the counter value reaches a value equal to a value in a respective gain register, e.g. gain registers 118 and 218, for each the pixel of the DROIC.

The method can include incrementing a counter value in the second binary counter each time the counter value of the first binary counter reaches the value equal to the value in the respective gain register. The method can include masking a subsequent pulse after resetting the counter value of the first binary counter to refrain from incrementing the counter value in the secondary binary counter for the subsequent pulse, thus applying gain.

In another aspect, it is contemplated that the method can include loading an offset register value, e.g., from offset registers 122 and 222, into the second binary counter in the DROIC to initialize the counter value of the second register at the beginning of frame integration, and reading out the counter value from the second binary counter at the end of frame integration so that the second binary counter reads out gain and offset corrected digital output for each respective pixel pitch of the DROIC. This readout from each pixel can be provided to a processor outside of the DROIC for post-processing and/or output, e.g., as output of a camera. Offset and gain registers for each pixel pitch of the DROIC need only be loaded once for multiple frame integrations, e.g., when the imaging sensor system such as a camera incorporating system 100 is first powered on.

The methods and systems of the present disclosure, as described above and shown in the drawings, provide for digital gain and offset corrections with superior properties including the removal of the necessity to require DRAM to store correction values for each frame that is integrated. Therefore, power and bandwidth requirements are reduced as corrections values are no longer required to be read out of a DRAM for every frame, and corrections can be implemented immediately in each pixel in the DROIC, allowing additional post-corrections processing to also be done on the DROIC. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method comprising:
   correcting for at least one of gain and offset during frame integration for photodetector events, wherein gain and offset correction is performed separately in each pixel pitch of a digital read-out integrated circuit (DROIC) for a plurality of corresponding pixels in a photodetector array, wherein the DROIC includes a first binary counter and a second binary counter in each pixel pitch of the DROIC and wherein correcting includes:
   counting pulses in a pulse stream by incrementing a counter value in the first binary counter of each pixel in the DROIC;
   resetting counter value in the first binary counter whenever the counter value reaches a value equal to a value in a respective gain register for each the pixel pitch of the DROIC; and
   masking a subsequent pulse after resetting the counter value of the first binary counter to refrain from incrementing the counter value in the secondary binary counter for the subsequent pulse.

2. The method as recited in claim 1, further comprising:
   loading an offset register value into the second binary counter in the DROIC to initialize the counter value of the second register at the beginning of frame integration; and
   reading out the counter value from the second binary counter at the end of frame integration so that the second binary counter reads out a gain and offset corrected digital output for each respective pixel pitch of the DROIC.

3. The method as recited in claim 2, wherein offset and gain registers for each pixel pitch of the DROIC are only loaded once for multiple frame integrations.

4. A system comprising:
   a photodetector array including a plurality of photodetector pixels;
   a read-out integrated circuit (ROIC) operatively connected to the photodetector array; and a digital read-out integrated circuit (DROIC) operatively connected to the ROIC to receive pixel pulses from the ROIC indicative of photodetector events incident on the photodetector pixels, wherein the DROIC is configured for correcting for at least one of gain and offset during frame integration for photodetector events, wherein gain and offset correction is performed separately in each pixel pitch of the DROIC for a plurality of corresponding pixels in a photodetector array, wherein the DROIC includes a respective pixel for each of the photodetector pixels, wherein each pixel of the DROIC includes:
   a first binary counter configured to increment a counter value of the first binary counter in response to analog pixel pulses read into the first binary counter;
   a comparator operatively connected to a respective gain register and to the first binary counter to compare the counter value of the first binary counter to a gain value of the gain register; and
   a second binary counter operatively connected to the comparator which disables the second binary counter each time the counter value of the first binary counter equals the gain value of the gain register.

5. The system of claim 4, further comprising a respective offset register in each pixel pitch of the DROIC operatively connected to the second binary counter, wherein the second binary counter is configured to initialize the counter value of the second binary counter to equal an offset value of the offset register and to read out gain and offset corrected digital output.

6. The system of claim 4, further comprising at least one of a non-volatile memory or a dynamic random access memory (DRAM) operatively connected to the DROIC to load values for the offset register and the gain register for each pixel pitch of the DROIC only once for multiple frame integrations.

7. The system of claim 4, wherein each of the first binary counter and the second binary counter are operatively connected to receive a pulse stream from an imaging pixel.

8. The system of claim 7, wherein the comparator has an output connected to reset the counter value in the first binary counter whenever the counter value of the first binary counter equals the gain value of the gain register, and further comprising a NOT logic component connecting the output of the comparator to the second binary counter to disable the second binary counter when the counter value in the first binary counter equals the gain value of the gain register.

9. The system of claim 4, wherein only the first binary counter is operatively connected to receive a pulse stream from an imaging pixel, and the second binary counter is not directly connected to receive the pulse stream.

10. The system of claim 9, wherein the comparator has an output connected to reset the counter value in the first binary counter whenever the counter value of the first binary counter equals the gain value of the gain register, and further comprising an XOR logic component, wherein the XOR logic component includes two inputs, one connected to receive the pulse stream from the imaging pixel and another connected to the output of the comparator, and wherein the XOR logic component includes an output connected as an input to the second binary counter.

11. The system of claim 4, wherein at least one of the gain register or the offset register is physically located in the pixel pitch of the DROIC for each respective pixel pitch of the DROIC.

12. The system of claim 4, wherein at least one of the gain register or the offset register is physically located outside of the pixel pitch of the DROIC for each respective pixel pitch of the photodetector array.

\* \* \* \* \*